United States Patent Office 3,353,901
Patented Nov. 21, 1967

3,353,901
INCREASING WASH FASTNESS OF DYES ON CELLULOSIC MATERIALS WITH N-METHYLOLATED QUATERNARY AMMONIUM UREIDO AND URETHANE COMPOUNDS
Carl Taube, Leverkusen, and Klaus Böckmann and Karl-Heinz Freytag, Cologne-Stammheim, Germany, assignors to Farbenfabriken Bayer Aktiengesellschaft, Leverkusen, Germany, a German corporation
No Drawing. Filed Jan. 30, 1963, Ser. No. 255,098
Claims priority, application Germany, Feb. 21, 1962, F 36,082
1 Claim. (Cl. 8—74)

ABSTRACT OF THE DISCLOSURE

Applicant's invention is a process for improving the fastness to washing of dyeings and prints on cellulose-containing materials with dyestuffs containing water soluble groups, which consists in treating the dyeings and prints with an active amount of an aqueous solution of an N-methylolated nitrogen-containing compound having about 1–100 quaternary ammonium radicals. The nitrogen atom of each ammonium radical is connected to the nitrogen atom of ureido or a chain oxygen of urethane groups by bridging alkylene groups up to 2 times. The quaternary ammonium radicals are connected to each other with (1) alkylene, (2) dialkylene ether or (3) trialkylene bisureido or dialkylene ureido moieties. The terminal ureido or urethane group has an N-alkyl substituent thereon.

The present invention relates to a process for improving the fastness to washing of dyeings and prints on cellulose-containing materials produced with dyestuffs containing water-solubilizing groups; more particularly, it concerns a process which consists in treating the dyeings and prints with aqueous solutions of methylol derivatives of nitrogen-containing compounds, possessing, in the molecule, at least one quaternary ammonium group and at least two carbamide groups which are capable of condensing with formaldehyde and which are all derived from primary amines.

This process improves the wash fastness of dyeings and prints on cellulose-containing materials with dyestuffs containing water solubilizing groups which consists in treating the dyeings and prints with an active amount of an aqueous solution of an N-methylolated nitrogen-containing compound having about 1–100 quaternary ammonium radicals, the nitrogen atom of each ammonium radical being connected to the nitrogen atom of ureido or a chain oxygen of urethane groups by bridging alkylene groups up to two times, quaternary ammonium radicals being connected to each other with (1) alkylene, (2) dialkylene ether, (3) trialkylene bisureido, or dialkylene ureido moieties; the terminal ureido or urethane groups having an N-alkyl substituent. Alkylene and dialkylene ether groups can bridge the quaternary nitrogen. In the first example, 2 mols of N-3-dimethylaminopropyl-N'-methyl urea is reacted with 1 mol of 1,4-dichlorobutane to form a butylene bridged di-(dimethyl-N'-methylureidopropylene) quaternary ammonium compound which is methylolated and applied to dyed cellulosic textiles.

As nitrogen-containing compounds whose methylol compounds are to be applied in the process of the invention the following may be considered, for example,

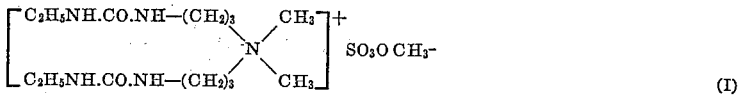 (I)

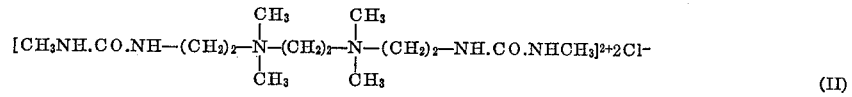 (II)

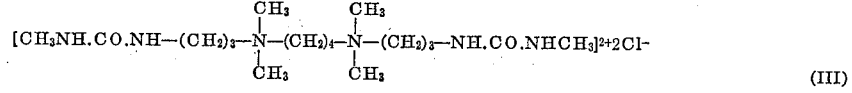 (III)

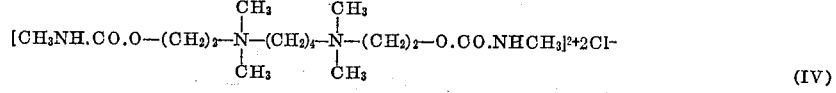 (IV)

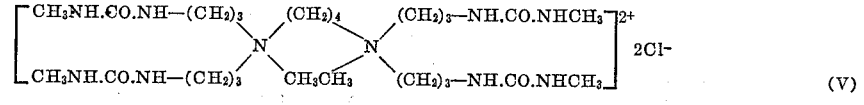 (V)

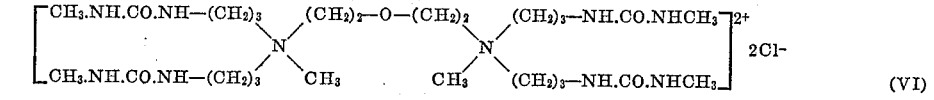 (VI)

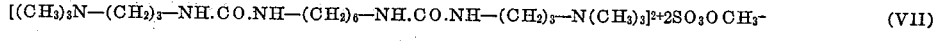 (VII)

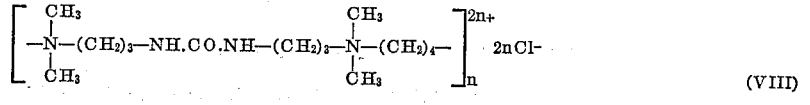 (VIII)

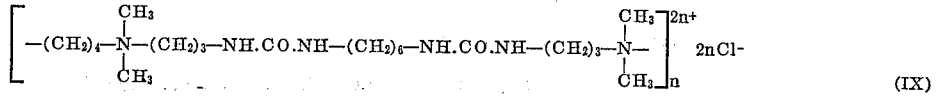 (IX)

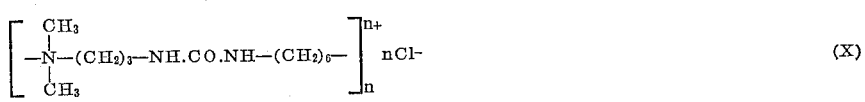  (X)
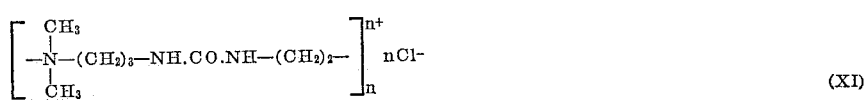  (XI)
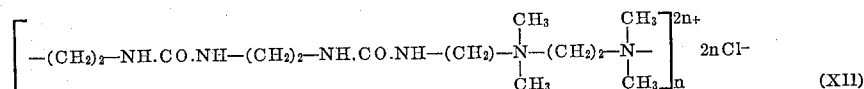  (XII)
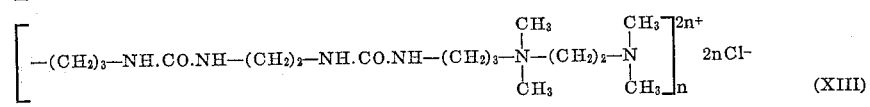  (XIII)
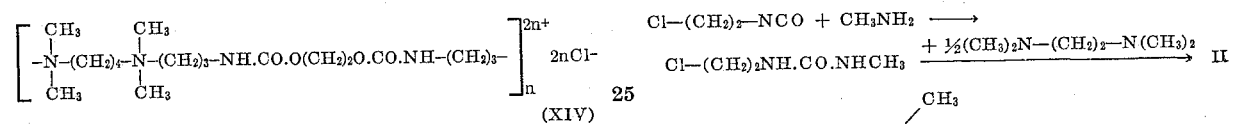  (XIV)
In these formulae $n$ stands for a number from 2 to about 50. Thus, up to 100 quaternary ammonium groups are in the molecules of these nitrogenous compounds.
The nitrogen-containing compounds are obtainable by methods known as such. Examples for these can be seen in the following equations:
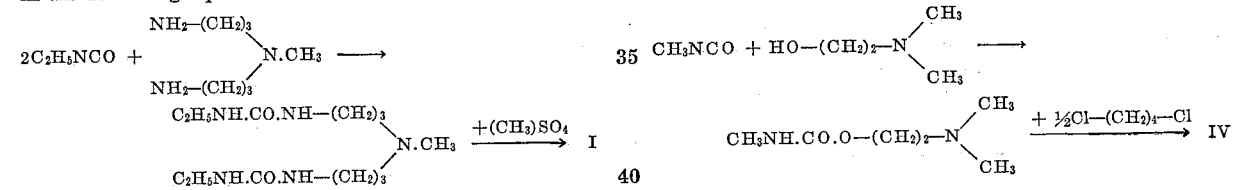
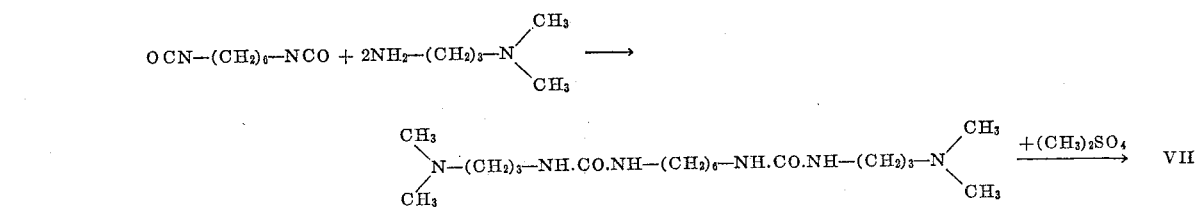
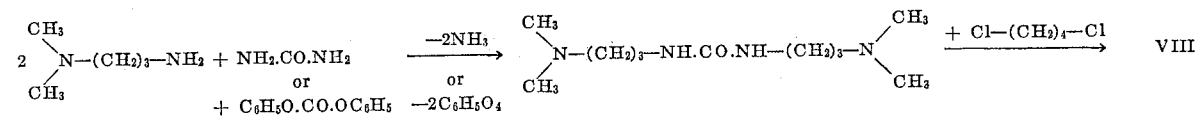
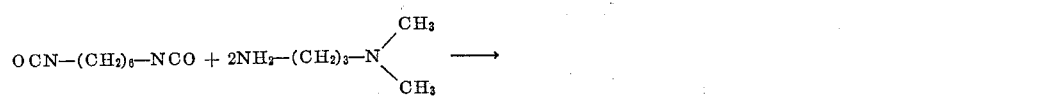
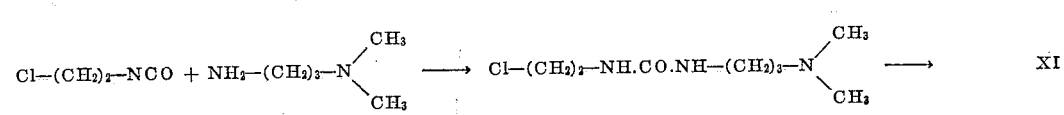
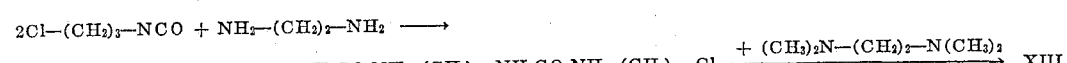
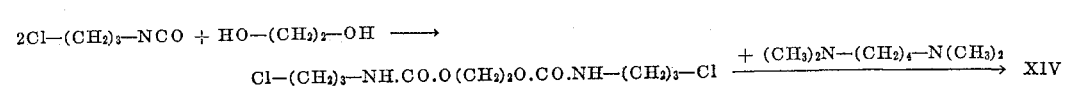

For the preparation of the methylol compounds of the nitrogen-containing compounds the usual methods can be employed, for example, the reaction with aqueous or anhydrous formaldehyde or dihydroxymethylene at a pH-value between 7 and 10 and at temperatures between about 10 and 90° C.

The application of the methylol compounds to be used according to the invention is carried out in the usual manner by impregnating the materials to be treated in an aqueous solution of the methylol compounds with the addition of acid-dissociating catalysts, then squeezing and drying them, and subsequently heating them for a short time to higher temperatures.

The improvement of the fastness to washing which is attained with the methylol compounds to be applied according to the invention is surprisingly stronger than the improvement of the fastness to washing attained with known methylol compounds as described, for example in Austrian patent specification No. 209,305.

The following examples serve to illustrate the invention without, however, limiting its scope.

*Example 1*

A 3% dyeing with the dyestuff of Example 1 of German patent specification 955,801 on cotton fabric is impregnated with an aqueous solution containing per litre 60 g. of the methylol compound of the compound obtained by the reaction of 2 mols of N-3-dimethylaminopropyl-N'-methyl urea with 1 mol of 1,4-dichlorobutane and 10 g. of magnesium chloride; the fabric is then squeezed to a weight increase of 80-90%, dried at 80° C. and subsequently heated to 150° C. for 5 minutes. The dyeing thus treated has excellent fastness to washing.

*Example 2*

A 3% dyeing with the dyestuff of Example 5 of German patent specification 1,098,649 on a fabric of mercerized cotton is padded with an aqueous solution containing per litre 65 g. of the methylol compound of the compound obtained by the reaction of 2 mols of the amine of the formula

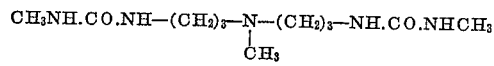

with 1 mol of 1,4-dichlorobutane and 10 g. of zinc chloride; the fabric is then dried and heated as described in Example 1. The dyeing thus finished has excellent fastness to washing.

*Example 3*

A 4% dyeing with the dyestuff Colour Index, 2nd edition, No. 34,215, on a cotton fabric is padded on the foulard with an aqueous solution containing per litre 50 g. of the methylol compound of the compound obtained by the reaction of 1 mol of N,N'-bis-(dimethylaminopropyl)-urea with 1 mol of 1,4-dichlorobutane, and 10 g. of magnesium chloride, the fabric is then dried and heated at 160° C. for 3-4 minutes. The dyeing thus treated withstands repeated washing at 95° C.

*Example 4*

A cotton fabric is printed with a paste prepared from 25 g. of the dyestuff according to Example 5 of German patent specification 1,098,649, 100 g. of urea, 30 g. of thiodiglycol, 10 g. of diethylene glycol, 400 g. of carboxymethyl cellulose (8%) or 400 g. of sodium alginate (8%), 10 g. of sodium-m-nitrobenzene-sulphonate and 425 g. of boiling water. The printed fabric is dried, steamed for 20 minutes, then washed for 20 minutes at 25-30° C. in an aqueous solution containing per litre 2 g. of soap, subsequently rinsed and again dried.

The printed fabric is then impregnated with an aqueous solution containing per litre 50 g. of the methylol compound described in Example 3 and 10 g. magnesium chloride, padded on the foulard, then dried and heated at 150° C. for 5 minutes. The fastness to washing of the print thus treated is very good.

We claim:

A process for improving the fastness to washing of dyeings and prints on cellulose-containing materials with dyestuffs containing water-solubilizing groups which consists in treating the dyeings and prints with an active amount of an aqueous solution of an N-methylolated nitrogen-containing compound having about 1-100 quaternary ammonium radicals, the nitrogen atom of each ammonium radical being connected to the nitrogen atom of ureido or a chain oxygen of urethane groups by bridging alkylene groups up to two times, quaternary ammonium radicals being connected to each other with (1) alkylene,
(2) dialkylene ether, or
(3) trialkylene bisureido or dialkylene ureido moieties; the terminal ureido or urethane groups having an N-alkyl substituent.

References Cited

UNITED STATES PATENTS

| 2,203,492 | 6/1940 | Evans | 8—84 |
| 2,203,493 | 6/1940 | Evans | 8—84 |

FOREIGN PATENTS

| 887,358 | 1/1962 | Great Britain. |
| 897,276 | 5/1962 | Great Britain. |
| 1,276,406 | 10/1961 | France. |

DONALD LEVY, *Primary Examiner.*

NORMAN G. TORCHIN, *Examiner.*